Patented Aug. 16, 1938

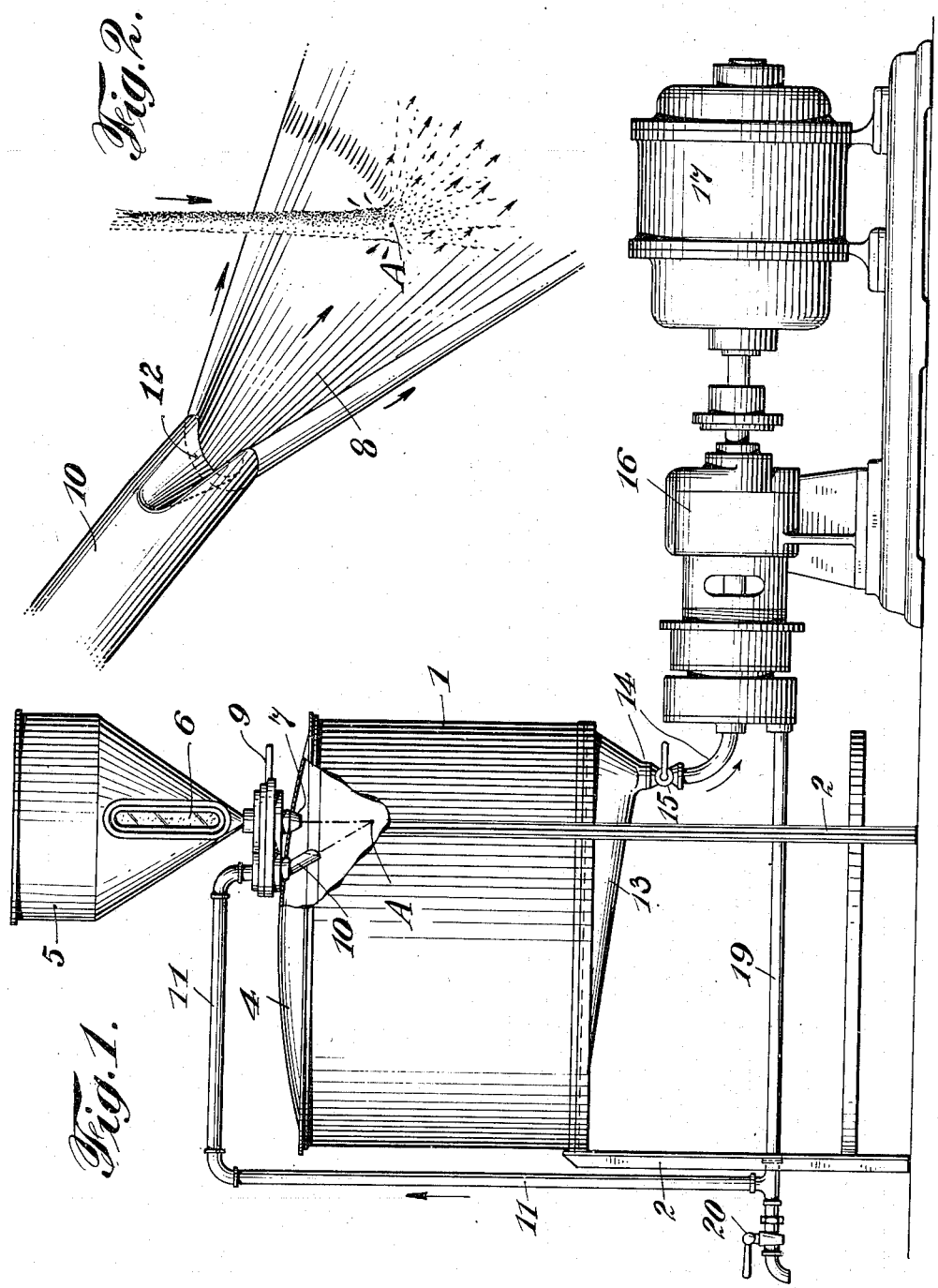

2,126,911

UNITED STATES PATENT OFFICE 2,126,911

METHOD AND APPARATUS FOR DISPERSING PECTIN AND THE LIKE

George W. Mullen, Flushing, N. Y.

Application January 6, 1936, Serial No. 57,753

13 Claims. (Cl. 99—132)

The present invention relates to a method and apparatus for dispersing finely divided particles of material and more particularly to a method and apparatus for dispersing pectin.

Powdered pectin is used extensively in the preparation of jams, jellies and the like and is an example of a material to which the present invention is particularly applicable. Heretofore, many difficulties have been encountered in providing liquid dispersions or "solutions" of pectin because powdered pectin, when added to the liquid, had a tendency to form lumps or agglomerates which were not properly dispersed. Such lumpy dispersions are very unsatisfactory, since they do not provide satisfactory jams or jellies. Also, in many cases powdered pectin had a tendency to form a froth or float on top of the liquid in the making of jellies and jams and did not become a constituent of the jelly or other product. As a result, the froth was removed as waste, thus occasioning a loss of pectin. Also, the finished dispersion then did not contain the proper proportion of ingredients and did not possess the desired physical characteristics. Attempts have been made to overcome these objections by putting the pectin into the batch with sugar and subjecting the batch to heat. The heat partially decomposed the pectin and occasioned a loss of its strength, thus requiring the manufacturer to use an additional amount of pectin to compensate for the loss. Pectin shipped in its liquid form is unsatisfactory because when the container is opened and left open for a day or more the liquid pectin will spoil and lose its strength. Also, liquid pectin is more bulky and when shipped carries more freight. In spite of these objections and disadvantages, liquid pectin is shipped to packers of jellies, jams and preserves and is used in substantial quantities by packers because of the difficulty and losses encountered in the use of dry pectin.

The present invention aims to overcome the above difficulties by providing a simple inexpensive method and apparatus for dispersing pectin or similar materials effectively and efficiently to produce homogeneous dispersions or colloidal solutions, whereby the pectin may be shipped in powdered form to the packer and the packer may disperse it in solution. In this way the advantages of both liquid and powdered pectin are attained without the disadvantages of either. The present invention further aims to reduce the cost of making pectin products or the like by providing a method and apparatus for efficiently dispersing pectin powder to form highly concentrated pectin solutions.

An object of the present invention is to provide a simple inexpensive method and apparatus for dispersing finely divided particles of material in a liquid.

Another object of the invention is to provide a method for producing homogeneous pectin dispersions or colloidal solutions.

Another object of the invention is to prevent waste of the material dispersed and to eliminate lumps or clots in the dispersion.

Another object of the invention is to improve the finished product such as jam or jelly, by providing a method of making uniform pectin dispersions which are not subject to variations in chemical constituents and which have a minimum amount of water or liquid to be evaporated during cooking.

Another object of the invention is to reduce the cost of and time required for producing pectin dispersions or the like.

Another object of the invention is to provide a pectin dispersion and adding the dispersion to a batch of jam or jelly in its last stage at a relatively low temperature to eliminate loss of the strength of the pectin due to heat.

A further object of the invention is to provide a method and apparatus for dispersing pure pectin powder which is equally adapted for dispersing mixtures containing pectin and sugar or pectin syrups and which is particularly useful to packers.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is an elevational view, partly in section, of a preferred embodiment of the present invention; and Fig. 2 is an enlarged perspective view, partly in section, illustrating a preferred method of uniting particles of material and liquid.

Referring to the drawing there is shown a suitable receptacle, such as a tank or vat 1, which may be supported by a standard 2, mounted on a platform or attached to the floor. The tank is provided with a removable cover 4 which, if desired, may be secured to the top of the tank while the device is operated and may be removed when it is desired to clean the tank.

In order to deliver pectin or other material to the tank, a hopper 5, funnel or other feeding device is mounted on the cover or is suitably supported above the tank. If desired, the hopper may be provided with a show-glass 6 or other transparent means so that the amount of material in the hopper is readily visible. Also, a sifter or screening device may be associated with the hopper for eliminating lumps or clots which might clog up the hopper at its delivery end. Preferably, the lower end of the hopper is provided with a nozzle 7, or other aperture adapted to form a substantially fine spray or stream of pectin particles or other material. The rate of flow of the stream may be controlled by a suitable valve 9, such as a slide valve, which may also be closed to stop the flow of material.

A nozzle 10 is provided adjacent to the nozzle 7 for spraying a divergent stream of liquid into or against the stream of particles so that the liquid spray meets the stream of material at a point below the cover, indicated herein by the reference character A. It is desirable to wet the particles thoroughly before they reach the liquid in the reservoir. This may be achieved by the velocity of the stream and the angle of impact, by the shape of the stream, or by a combination of these or other suitable means. Preferably, the stream is channel-shaped or trough-like as shown at 8, and diverges as it leaves the nozzle 10. The particles of material delivered by the hopper 5 fall into the bottom of the trough 8 formed by the flowing stream of liquid or spray. In the preferred embodiment there is shown a nozzle having a U-shaped outlet 12 adapted to form a trough-like or U-shaped stream or spray (Fig. 2). The particles are directed toward the bottom of the trough-like stream and the particles are enveloped by the stream and thoroughly wetted before reaching the reservoir or liquid. In this manner, all of the particles are subjected to the wetting action of the stream and carried by it into the reservoir without the formation of lumps. The pectin acts with the water to become hydrated and then, like a true colloid, has a tendency to form a "gell". The fluid is supplied to the nozzle 10 by a suitable conduit 11 which will be described in detail hereafter.

Preferably, the lower end or bottom 13 of the tank is shaped to facilitate withdrawing the mixture of liquid and particles through a suitable outlet conduit 14 which may be provided with a valve 15.

To insure a homogeneous colloidal suspension or solution wherein the particles are thoroughly dispersed and to prevent the pectin from forming a "gell", a suitable agitating device may be connected to the tank outlet. Such a device may be a mixing tank or a reciprocating or centrifugal pump, roller mill or the like, but the present invention contemplates the provisions of a colloid mill 16 adapted to be driven by a suitable source of power such as a motor 17. The colloid mill withdraws the mixture of water and particles from the outlet 14, agitates the solution and breaks down the particles to provide a dispersion. In this manner, the hydrated particles having a tendency to "gell" are converted into a dispersion which resembles a solution. Due to the speed at which the mill is operated, it acts as a pump to pump the dispersion into a mill outlet conduit 19 which is connected to the conduit 11. The dispersion or colloidal suspension is then pumped to the nozzle 10 at the proper velocity to effect thorough wetting of the incoming particles of pectin and is recirculated so that it is repeatedly sprayed at a suitable velocity against additional particles of material dropping from the hopper 5. The dispersion is like a solution having a wetting action. It does not "gell" or become viscous and may be circulated continuously until all of the particles are in solution thereby insuring complete mixing of the particles. In order to withdraw the finished dispersion from the tank, the tank may be provided with any suitable outlet, but preferably, as illustrated herein, a valve such as a faucet or cock 20 is provided in the mill outlet conduit 19.

A preferred method of operation will now be described, wherein, for illustrative purposes, a suspension or dispersion of pectin and water is provided, it being understood that dispersions of other materials such as colloids or solutions of substances such as crystalloids may be prepared by utilizing the present method and apparatus and that the proportions of liquid and finely divided material in other instances may vary. It will also be understood that the present method may be carried out with liquids or fluids other than water, for example, oils, alcohols or solvents may be desired as mixing liquids.

Preferably, the tank, the mill and conduits are first thoroughly cleaned by circulating several batches of water or other cleansing fluid therethrough and by washing the sides of the tank manually after removing the cover to facilitate access to the interior of the tank. After withdrawing the cleansing fluid and rinsing, the outlet valve 20 and the mill inlet valve 15 are closed and approximately ten gallons of water are placed in the tank. The valve 15 may then be opened and the mill may be started to circulate water through the conduits 14, 19 and 11 and through the spray nozzle 10. Concurrently, four to five pounds of powdered pectin (100 grade pectin or the equivalent of other grades) is placed in the hopper 5 and the slide valve 9 is opened and adjusted to provide a spray of material which will exhaust the supply of pectin during a desired period of time, preferably between five and fifteen minutes.

When these preliminary steps have been performed, the device is in full operation. The stream of pectin then falls into the trough 8 of the stream of fluid at A which thoroughly wets the particles. The united liquid and particles fall into the water in the tank, and the particles, by being wetted, are incorporated in the liquid and drawn towards the bottom whereby frothing or floating is eliminated. Also, lumps or clots are prevented from forming which might clog up the conduits or impair the operation of the colloid mill. The resulting mixture is withdrawn from the tank through the outlet 14 into the mill 16 wherein the particles are dispersed to provide a colloidal suspension. The dispersion or colloidal suspension is then pumped continuously back through the conduits 19 and 11 to the nozzle 10 until all the pectin particles in the hopper have been added to the tank. It is desirable to have the pectin solution as concentrated as possible to avoid prolonging, unduly, the cooking of jams, jellies and preserves in order to evaporate excess liquid. Prolonged cooking impairs the flavor of the product and also impairs the effectiveness of the pectin.

With the present process, it is possible to obtain a homogeneous solution with as much as five pounds of pectin to ten gallons of water or fruit juices. Such concentrated solutions minimize the amount of liquid to be evaporated in cooking and improves the flavor of the product in addition to reducing the cost of manufacture.

After the hopper is empty the dispersion may be removed from the tank by opening the valve 20 and permitting it to run out into a suitable receptacle and thereafter used in the making of jelly or jam. While the dispersion is being withdrawn the colloid mill may be permitted to run to accelerate emptying the tank by its pumping action, and at the same time subjecting the liquid and particles to another dispersing operation. Thereafter the device should be thoroughly cleaned and is ready for another run.

It will, of course, be understood that this method may be carried out with different proportions of pectin and water or in larger or smaller quantities, the quantities shown being illustrative, and the tank and mill may be of any desired capacity.

In practicing the above method, it has been found that good results can be obtained by using water at a temperature between 40 degrees and 200 degrees Fahrenheit, to prevent decomposition of the pectin due to heat. However, water at about 60 to 100 degrees Fahrenheit is preferred since the colloid mill, due to the vigorous action, has a tendency to slightly heat the water. If a "pasteurized" pectin dispersion is desired for canning or sealing in a hermetic container, water having a temperature between 180 and 200 degrees produces excellent results. If desired, sugar may be added to and fruit juices may be dissolved in the dispersion or used in place of water during the operation of the mill or the sugar may be dissolved in the water before the pectin is added. Preferably, the pectin dispersion is added to the jelly batch at its last stage so that the pectin need not be heated excessively, which would tend to cause hydrolysis in the presence of acid to form pectic acid which is useless in the making of jellies and jams.

Excellent results can be obtained with mixtures of pectin and sugar containing any desired percentage of pectin, but 100 grade pectin powder is preferred. The present invention also contemplates using fruit juices which may be used instead of water to minimize the amount of water which has to be evaporated during cooling.

It will be seen that the present invention provides a simple and inexpensive method and apparatus for preparing pectin dispersions or similar colloidal suspensions or the like in which substantially all of the pectin is dispersed in the solution and the waste of pectin is minimized or eliminated. The apparatus can be easily operated by a packer without the aid of skilled workmen. Likewise, the present method is performed more quickly than any known methods and a better dispersion without waste of pectin, is provided because lumps or clots are not formed and there is practically no frothing due to floating particles. In the event that the particles added contain irregularities, these are broken down and dispersed by the colloid mill. The cost of making pectin solutions is substantially reduced. By causing the stream of pectin to meet the stream of liquid above the liquid in the reservoir, substantially all of the pectin is delivered to the liquid in the reservoir in a proper condition to be dispersed. In this way all or substantially all of the pectin is dispersed and the pectin is fully effective when the dispersion is used in jellies, jams and the like.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of dispersing finely divided particles of pectin, which method comprises causing a divergent stream of liquid to contact a stream of finely divided particles of pectin, and agitating the mixture of liquid and pectin to form a dispersion.

2. The method of dispersing finely divided particles of material which tends to clot, which method comprises causing a stream of finely divided particles of said material to contact a diverging spray of liquid, and agitating the mixture of liquid and finely divided particles to form a dispersion.

3. The method of dispersing finely divided particles of pectin, which method comprises causing a diverging trough-shaped stream of water to contact a stream of finely divided particles of pectin, and agitating the mixture of water and pectin to form a dispersion.

4. The method of dispersing finely divided particles of material which tends to clot, which method comprises causing a divergent spray of liquid to contact a stream of finely divided particles of material to provide a mixture of liquid and particles, and spraying the mixture against additional finely divided particles of material whereby additional particles of material are contained in the mixture.

5. The method of dispersing pectin, which method comprises providing a trough-shaped divergent spray of water, and delivering a stream of powdered pectin to the trough of the spray to thoroughly wet the pectin and provide a mixture of pectin and water, and passing said mixture through a colloid mill.

6. The method of dispersing pectin, which method comprises providing a stream of powdered pectin, spraying a divergent stream of water against said stream of pectin to provide a mixture of pectin and water, vigorously agitating said mixture to provide a dispersion, and thereafter spraying said dispersion against said stream of pectin.

7. The method of providing pectin dispersions, which method comprises causing a predetermined amount of powdered pectin to flow from a hopper at a predetermined rate to provide a stream of finely divided pectin particles, causing a spray of a predetermined volume of water to meet said stream of pectin to wet the particles thereof, collecting the mixture of pectin particles and water, dispersing the mixture by passing it through a colloid mill, and spraying said dispersion against the stream of pectin particles until the predetermined amount of pectin has flowed from the hopper and has been dispersed in the predetermined volume of water.

8. In a device of the class described, the combination of a receptacle having an outlet, a hopper for delivering a stream of material which tends to clot to said receptacle, means adjacent to the delivery end of said hopper for directing a divergent spray of liquid against the stream of material delivered from the hopper, and means operatively connected to said outlet and said first means for continuously circulating liquid from said outlet to said first means.

9. In a device of the class described, the combination of a tank, means for delivering a stream of finely divided particles of material to said tank, means for directing a divergent trough-shaped spray of liquid against said stream of particles to provide a mixture of liquid and particles, and a colloid mill for further dispersing the particles in said liquid.

10. In a device of the class described, the combination of a receptacle, means for delivering a stream of powdered material to said receptacle, means adjacent said first means for directing a divergent spray of liquid against the stream of powdered material, and a colloid mill adapted to receive the liquid and powdered material from said receptacle and adapted to disperse the powdered material in the liquid.

11. In a device of the class described, the combination of a receptacle, means for delivering a stream of powdered material to said receptacle, means adjacent said first means for directing a divergent spray of water against the stream of powdered material, a colloid mill adapted to disperse the powdered material in the water, and a conduit connecting said colloid mill to said nozzle, said colloid mill being adapted to pump the dispersion to said nozzle.

12. In a device of the class described, the combination of a receptacle, means for delivering a trough-shaped divergent stream of liquid to said receptacle, means for delivering a stream of finely divided particles to the trough of the stream whereby the particles are adapted to be mixed in the stream, and means for agitating the mixture.

13. In a device of the class described, the combination of a receptacle, means for delivering a divergent stream of water to said receptacle, means for delivering a stream of finely divided particles of pectin to the stream whereby the particles are adapted to be mixed with the water of the stream, and means for agitating the mixture.

GEORGE W. MULLEN.